United States Patent
Rawat et al.

(10) Patent No.: US 8,553,505 B2
(45) Date of Patent: *Oct. 8, 2013

(54) THERMALLY ASSISTED MAGNETIC WRITE HEAD EMPLOYING A PLASMONIC ANTENNA COMPRISING AN ALLOYED FILM TO IMPROVE THE HARDNESS AND MANUFACTURABILITY OF THE ANTENNA

(75) Inventors: Vijay P. S. Rawat, San Jose, CA (US); Barry C. Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 182 days.

This patent is subject to a terminal disclaimer.

(21) Appl. No.: 12/954,461

(22) Filed: Nov. 24, 2010

(65) Prior Publication Data
US 2012/0127839 A1 May 24, 2012

(51) Int. Cl.
*G11B 11/00* (2006.01)

(52) U.S. Cl.
USPC .............. 369/13.33; 369/112.27; 360/110

(58) Field of Classification Search
USPC ......... 369/13.33, 13.32, 13.24, 13.14, 13.03, 369/13.02, 13.12, 112.27, 13.35, 13.17; 360/59, 360/125.31, 125.74, 110
See application file for complete search history.

(56) References Cited

U.S. PATENT DOCUMENTS

| | | | |
|---|---|---|---|
| 6,304,522 B1 | 10/2001 | Valet et al. | |
| 6,999,384 B2 | 2/2006 | Stancil et al. | |
| 7,032,427 B2 | 4/2006 | Niwa et al. | |
| 7,042,810 B2 | 5/2006 | Akiyama et al. | |
| 7,307,923 B2 | 12/2007 | Miyanishi et al. | |
| 7,652,954 B2 | 1/2010 | Fontana, Jr. et al. | |
| 8,169,881 B2 * | 5/2012 | Balamane et al. | 369/112.27 |
| 8,233,358 B2 * | 7/2012 | Zhou et al. | 369/13.33 |
| 8,335,052 B2 * | 12/2012 | Takayama et al. | 360/125.31 |
| 8,351,151 B2 * | 1/2013 | Katine et al. | 360/110 |
| 2007/0064544 A1 | 3/2007 | Okamoto | |
| 2007/0159718 A1 | 7/2007 | Kim et al. | |
| 2007/0177302 A1 | 8/2007 | Shimazawa et al. | |
| 2009/0219638 A1 | 9/2009 | Iwata et al. | |
| 2010/0046331 A1 | 2/2010 | Takayama et al. | |
| 2012/0105996 A1 * | 5/2012 | Katine et al. | 360/59 |

FOREIGN PATENT DOCUMENTS

| | | |
|---|---|---|
| JP | 2006202449 A | 8/2006 |
| JP | 2007328841 A | 12/2007 |

* cited by examiner

*Primary Examiner* — Ali Neyzari
(74) *Attorney, Agent, or Firm* — Zilka-Kotab, PC

(57) ABSTRACT

A thermally assisted write head having a plasmonic heating device. The plasmonic heating device has a plasmonic antenna located at an air bearing surface of the thermally assisted write head. The plasmonic antenna is constructed of an alloy that is sufficiently hard to withstand the processes such as ion milling and chemical mechanical polishing used to construct the plasmonic antenna. The plasmonic antenna is preferably constructed of AuX, where X is Cu, Ni, Ta, Ti, Zr or Pt having a concentration less than 5 atomic percent.

9 Claims, 10 Drawing Sheets

THERMALLY ASSISTED MAGNETIC WRITE HEAD EMPLOYING A PLASMONIC ANTENNA COMPRISING AN ALLOYED FILM TO IMPROVE THE HARDNESS AND MANUFACTURABILITY OF THE ANTENNA

FIELD OF THE INVENTION

The present invention relates to heat assisted magnetic recording, and more particularly to a magnetic write head having a plasmonic heating device. The plasmonic heating device includes a transparent aperture and an opaque metal plasmonic antenna with a notch to focus a broad laser spot energy into the notch. The plasmonic antenna is formed of a unique gold alloy for improved robustness during manufacture.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

Magnetoresistive sensors such as GMR or TMR sensors are employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current there-through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The write head can be a perpendicular magnetic recording head that records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In order to increase the areal density of the bits, and hence the data density, the media need to be fabricated of magnetic material with higher coercivity such that the small magnetic bits do not get demagnetized. In order to write on a media with higher coercivity, a heating element has to be incorporated into the perpendicular recording head. This heating element creates a localized hot spot on a magnetic bit on the media, momentarily decreasing the coercivity of the bit so that it can then be written with the perpendicular recording head.

SUMMARY OF THE INVENTION

The present invention provides a thermally assisted magnetic write head that includes a magnetic write pole and a plasmonic heating device. The plasmonic heating device includes an opaque, metallic plasmonic antenna and an aperture adjacent to the plasmonic antenna. A magnetic lip structure is disposed opposite the plasmonic antenna, such that the aperture is between the magnetic lip structure and the plasmonic antenna. The antenna is constructed of a gold alloy that is designed to facilitate manufacture.

The manufacture of an antenna for a plasmonic heating device requires various manufacturing steps such as ion milling and chemical mechanical polishing in order to define the final shape. While pure Au is a good antenna material for performance purposes, this material does not hold up well to these processes that are necessary to form the antenna. For example, the ion milling creates roughness on the sidewalls of a pure Au antenna and the chemical mechanical polishing roughens up the surface of the antenna and both of these roughnesses decrease the performance of the antenna. In addition, during lapping, polishing particles get embedded into the gold, since gold is a soft metal.

The present invention overcomes these problems by constructing the antenna of a metal alloy. This alloy can be AuX, AgX, CuX or AlX, including a small amount (e.g. less than 5 atomic percent) of element X, where X is Cu, Ni, Ta, Ti, Zr or Pt. This gives the antenna material sufficient hardness to withstand the manufacturing processes, without significantly affecting the performance of the plasmonic device.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
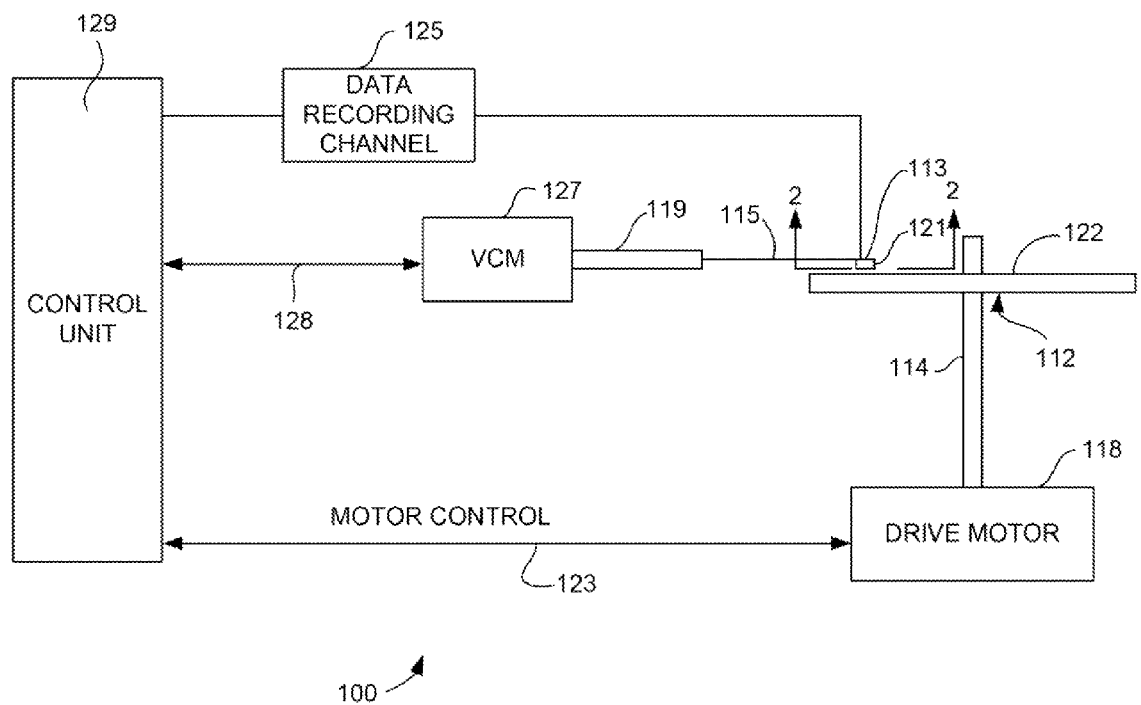
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
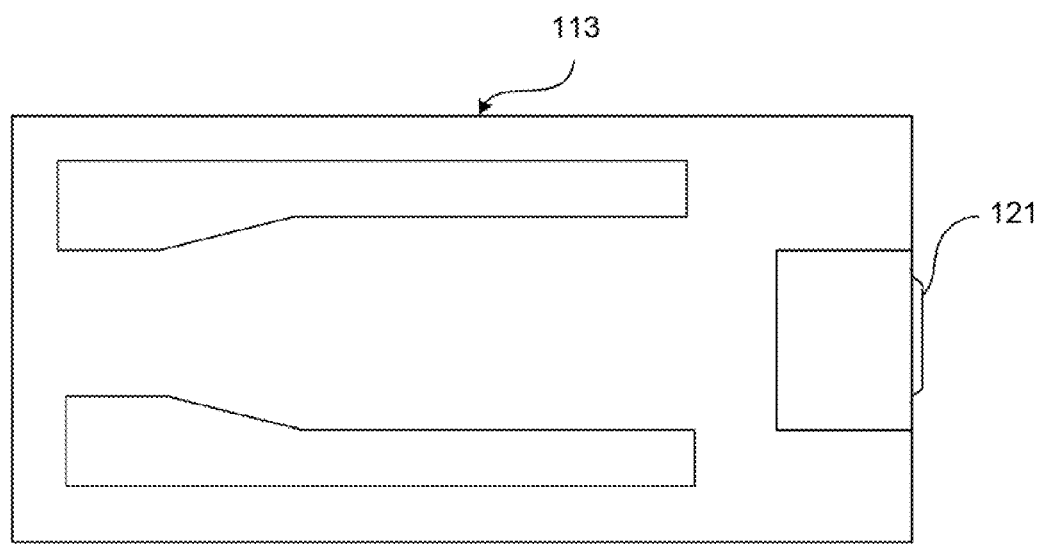
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
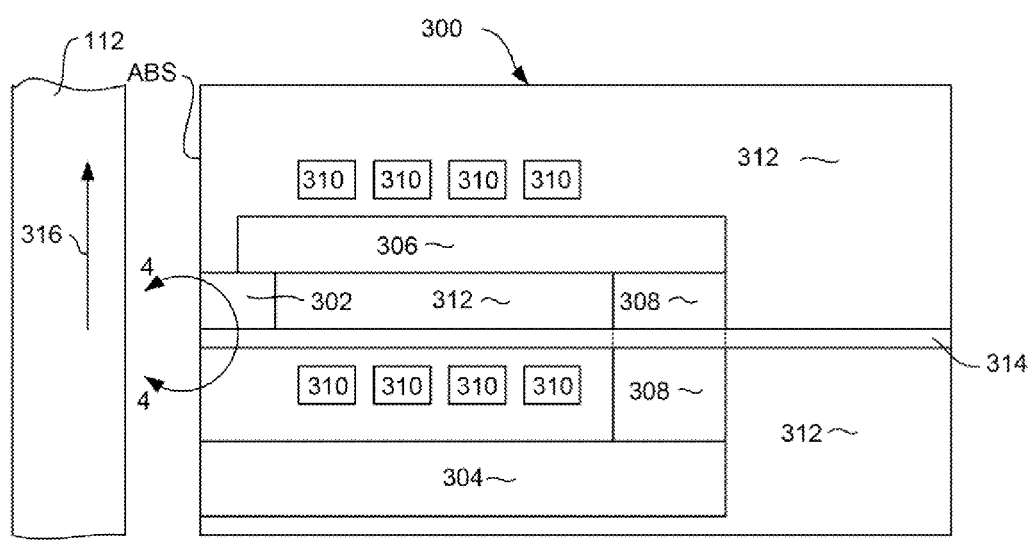
FIG. 3 is a side cross sectional view of a magnetic write head according to an embodiment of the present invention.

With reference now to FIG. 3, a write head 300 is described, which may be incorporated into a magnetic head such as head 121 shown in FIG. 2. The write head 300 can include a write pole 302 that extends to an air bearing surface (ABS) and a magnetic return pole 304. The return pole 304 has a cross section at the ABS that is larger than the cross section of the write pole 302 at the ABS. The write pole 302 can be connected with a shaping layer 306 in a region removed from the ABS. A magnetic back gap layer 308 connects the shaping layer 306 with the return pole 304 in a region removed from the ABS, thereby magnetically connecting the write pole 302 with the return pole 304 in a region removed from the ABS. The write pole 302, return pole 304, shaping layer 306 and back gap 308 are all constructed of a magnetic material such as NiFe, CoFe or CoNiFe. The write pole 302 is also constructed of a magnetic material and is preferably constructed of a lamination of layers of high magnetic moment material such as CoFe separated by thin layers of non-magnetic material.

An electrically conductive write coil 310, shown in cross section in FIG. 3, passes between the write pole 302 and the return pole 304 and may also pass beneath the write pole 302. The write coil 310 can be constructed of a non-magnetic, electrically conductive material such as Cu and can be embedded in a non-magnetic, electrically insulating material such as alumina 312.

With continued reference to FIG. 3, a plasmonic heating device 314 can be provided adjacent to the write pole 302 for locally heating the magnetic media 112. The plasmonic heating device 314 passes through an opening within the back gap layer 308 so that it can extend beyond the back gap layer 308. The magnetic media 112 travels in a direction indicated by arrow 316 relative to the write pole 302. Therefore, as can be seen, the plasmonic heating device 314 is upstream from the write pole 302, or in other words is in a leading direction relative to the write pole 302. The heating device 314 locally heats the magnetic media 112 in a region just upstream from the write pole 302, which momentarily reduces the coercivity of the magnetic media. This greatly facilitates writing to a magnetic media which otherwise has too high a coercivity to write to. In order for the heating device 314 to effectively function, it must be located as close as possible to the write pole. In addition, the heating device 314 must heat only a very small area on the media 112 in order to avoid demagnetizing adjacent tracks of data or downstream data on the same track.

Figure 4:
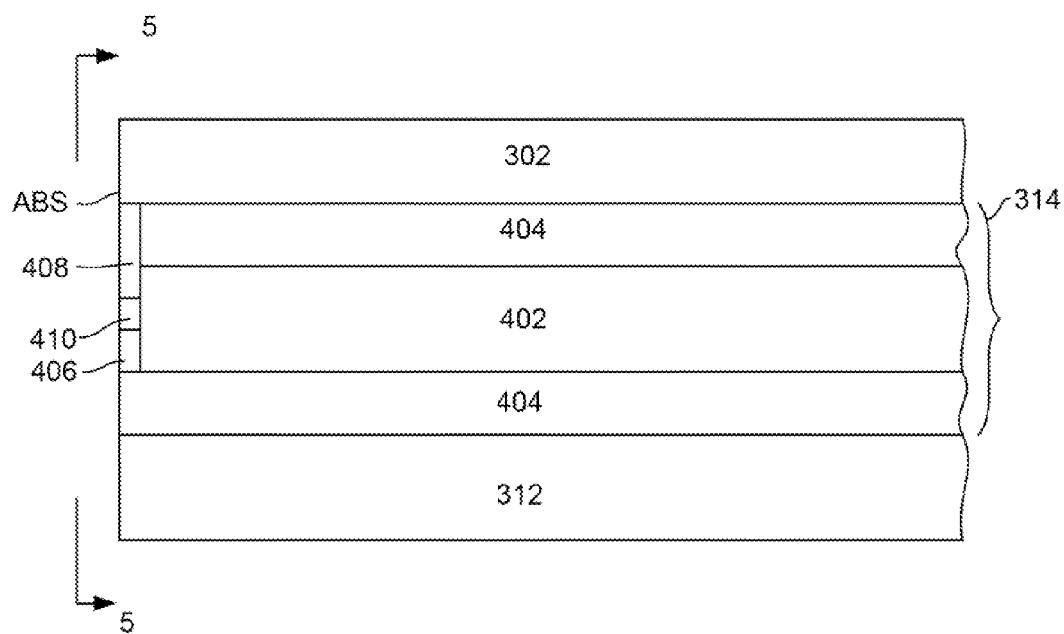
FIG. 4 is an enlarged view of a portion of the magnetic write head as taken from circle 4-4 of FIG. 3.
Figure 5:
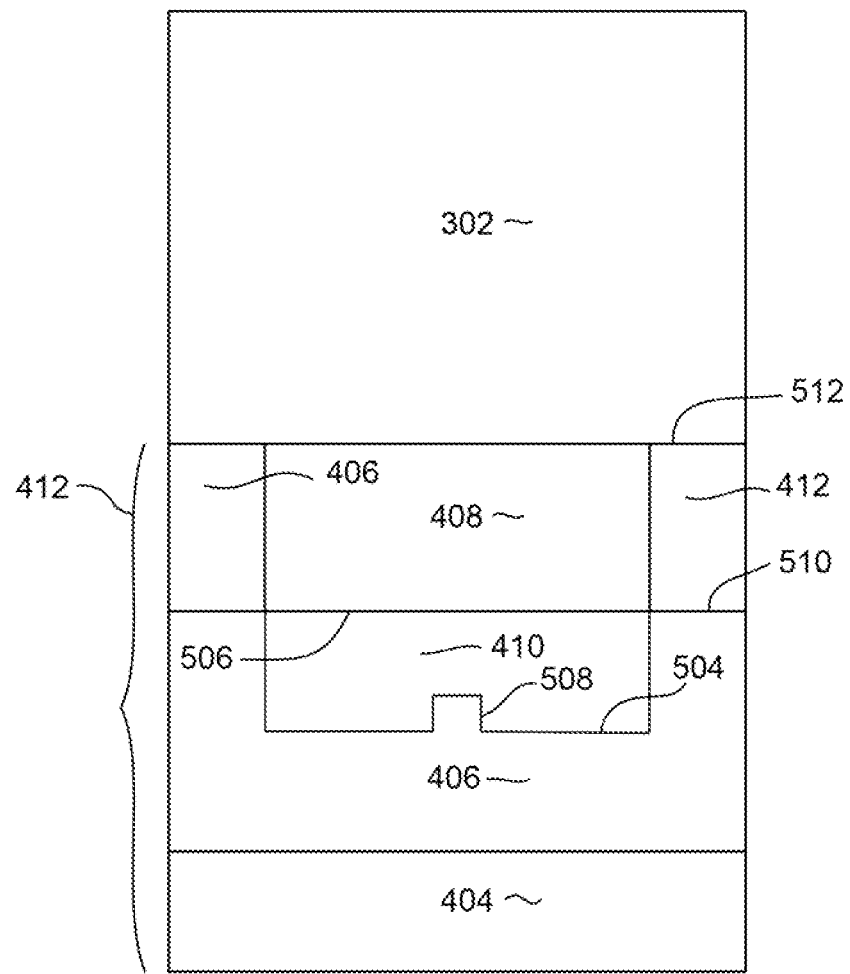
FIG. 5 is an ABS view of a portion of the write head as seen from line 5-5 of FIG. 4.

FIG. 4 shows an enlarged view of a portion of the plasmonic heating device 314 as seen from circle 4 of FIG. 3. FIG. 5 shows an ABS view of the structure shown in FIG. 4, as seen from line 5-5 of FIG. 4. With reference to FIG. 4, the plasmonic heating device 314 includes a light waveguide 402, which can be constructed of an oxide such as Tantalum oxide (Ta$_2$O$_5$), titanium oxide (TiO$_2$), niobium oxide (Nb$_2$O$_5$), zirconium oxide (ZrO$_2$), lanthanum oxide (La$_2$O$_3$), Yittrium oxide (Y$_2$O$_3$), scandium oxide (Sc$_2$O$_3$) or a binary, ternary or quaternary combination of these oxides. The wave guide 402 can also be constructed of oxynitrides such as silicon oxynitride (SiOxNy), tantalum oxynitride (TaOxNy), titanium oxynitride (TiOxNy) and zirconium oxynitride (ZrOxNy).

The waveguide 402 is surrounded by a cladding material 404, which can be a material such as alumina. The plasmonic heating device 314 also includes an opaque metal antenna 406 located at the ABS. A magnetic, metallic lip 408 may extend from the write pole 302 toward an aperture 410 formed between the magnetic lip 408 and the antenna 406.

The antenna 406, magnetic lip 408 and aperture 410 can be seen more clearly with reference to FIG. 5, which shows an ABS view of the structure as seen from line 5-5 of FIG. 4. As can be seen in FIG. 5, the cladding material 404, which can be a material such as alumina, fills the space beneath the antenna 406. The space 412 at the sides of the antenna 408 can be cladding material 404 or the antenna 406 could extend up the sides of the magnetic lip 408. Alternatively, the magnetic lip 408 could extend outward to fill the side spaces 412.

With continued reference to FIG. 5, the plasmonic antenna 406 is formed adjacent to the aperture 410, forming an interface 504 there-between. The plasmonic antenna 406 is constructed of a metallic alloy having a sufficient hardness to withstand the manufacturing processes used to define it. Pure Au would be a good candidate for the construction of an antenna 406 due to its unique electro-optical properties. However, any high throughput fabrication of plasmonic devices constructed of pure Au suffers from challenges due to the softness of pure Au. For example, the ion milling used to define the antenna, results in the antenna 406 having extremely rough side wall, while chemical mechanical polishing results in roughness on the top surface of the antenna 406. The dimensional control of the nano-scale plasmonic aperture 410 and antenna 406 is extremely critical. An 8 nm roughness on the back edge of the aperture 410 can reduce its performance by 15%.

To this end, the antenna 406 is constructed of a Au alloy, which has sufficient hardness to withstand the processing steps necessary for the construction of antenna 406, resulting in an extremely well defined antenna having smooth edges. The antenna 406 can be constructed of AuX, where X is Cu, Ni, Ta, Ti, Zr, V, Nb, Cr, Mo, Y, W, Ru, Rh or Pt. Preferably the antenna 406, constructed of AuX has a concentration of X that is less than 5 atomic percent. Surprisingly, the inventors have found that the performance of the plasmonic device is not significantly affected by the addition of these alloying elements, as it was previously believed that optimal performance could only be achieved by the use of pure gold (Au).

The magnetic lip 408 is magnetically connected with the write pole 302 and functions magnetically as a part of the write pole 302. The magnetic lip 408 is constructed of a magnetic metal such as a binary or ternary compound containing Co, Fe, Cr and or Ni (e.g. CoFe, CoFeCr, CoFeNi), and the leading most edge 506 functions as the writing edge of the lip 506. The aperture 410 is constructed of a low refractive index dielectric material such as SiOx, SiOxNy, Al$_2$O$_3$ or some other similar dielectric having a refractive index less than 1.75.

When light travels through the wave guide 402 (FIG. 4), a plasmonic wave is formed at the junction 504 between the antenna 406 and the aperture 410. The junction 504 between the antenna 406 and the aperture 410 is formed with a notch 508. This notch 508 is designed to form nodes in the plasmonic wave at desired locations.

Laser light is incident on the waveguide cross-section at the flex side of the slider and the light is carried and delivered by the waveguide 402 at the "E" shaped plasmonic antenna 406. The light impinging at the metal-dielectric interface 504 has its polarization parallel to the notch and thus creates a resonant plasmonic wave. The broad "wing" regions of the "E" shaped antenna 406 act as charge reservoirs and hence, set up the boundary condition. The space charge concentration is increased at the sub-100 nm dimension notch 508 of the antenna 406 as compared to the rest of the antenna due to a "lightning-rod" effect. This concentration of light energy at sub-wavelength dimensions leads to generation of a hot spot at the notch 508. This hot spot is used to locally heat the magnetic medium 112 (FIG. 3) to temporarily lower the magnetic coercivity at that location. The hot spot heats the media 112 in an extremely focused and small area of the media, smaller and more focused than would be possible using any other heating method.

Figure 8:
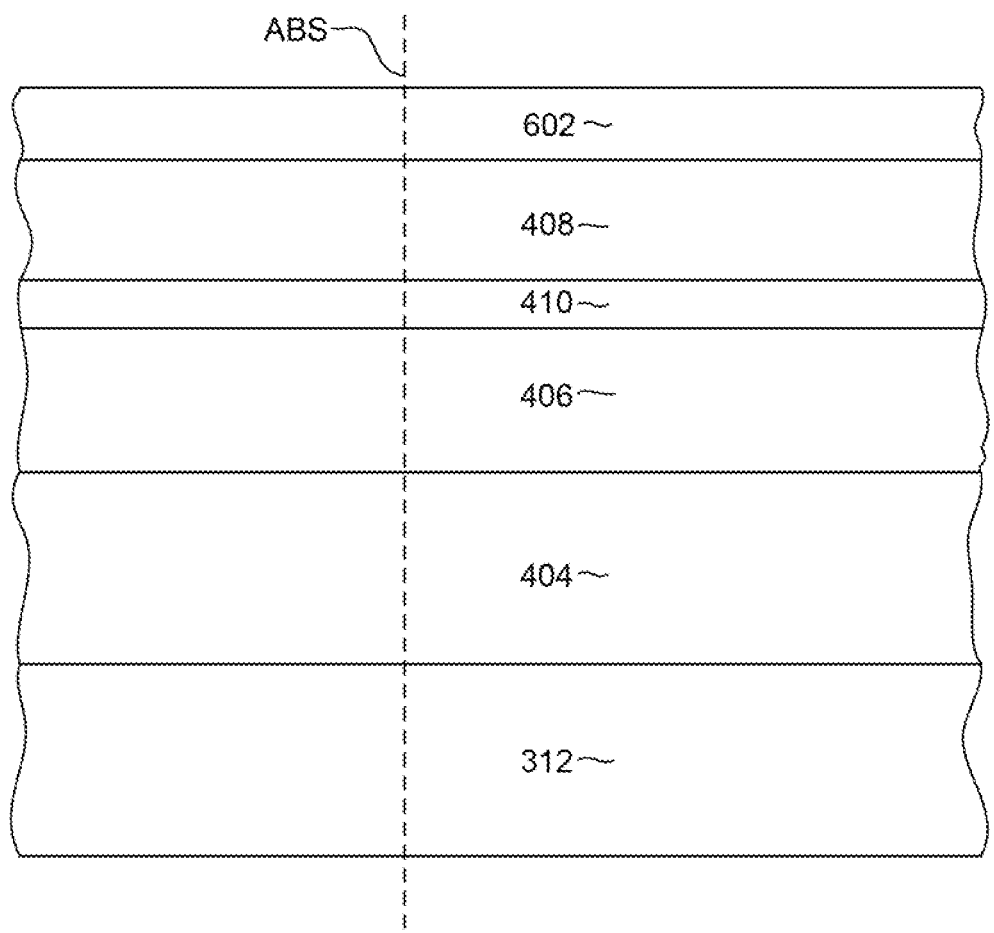
Figure 9:
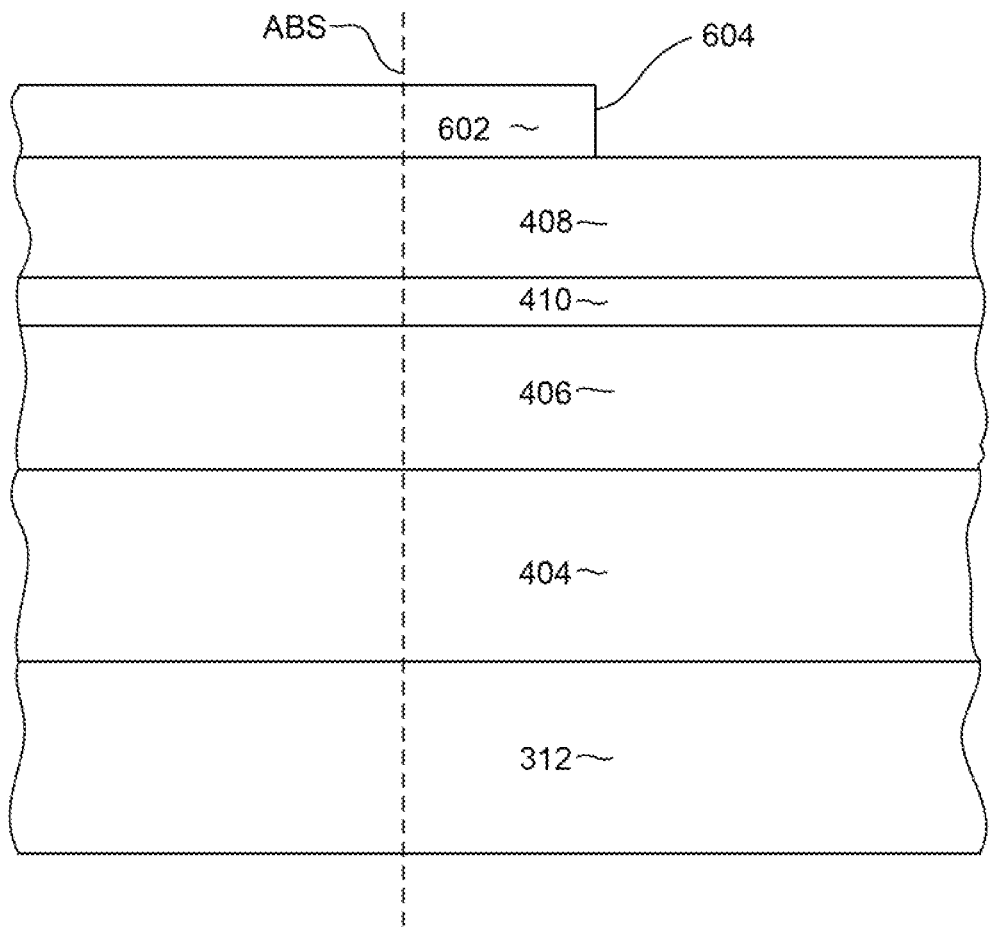
Figure 10:
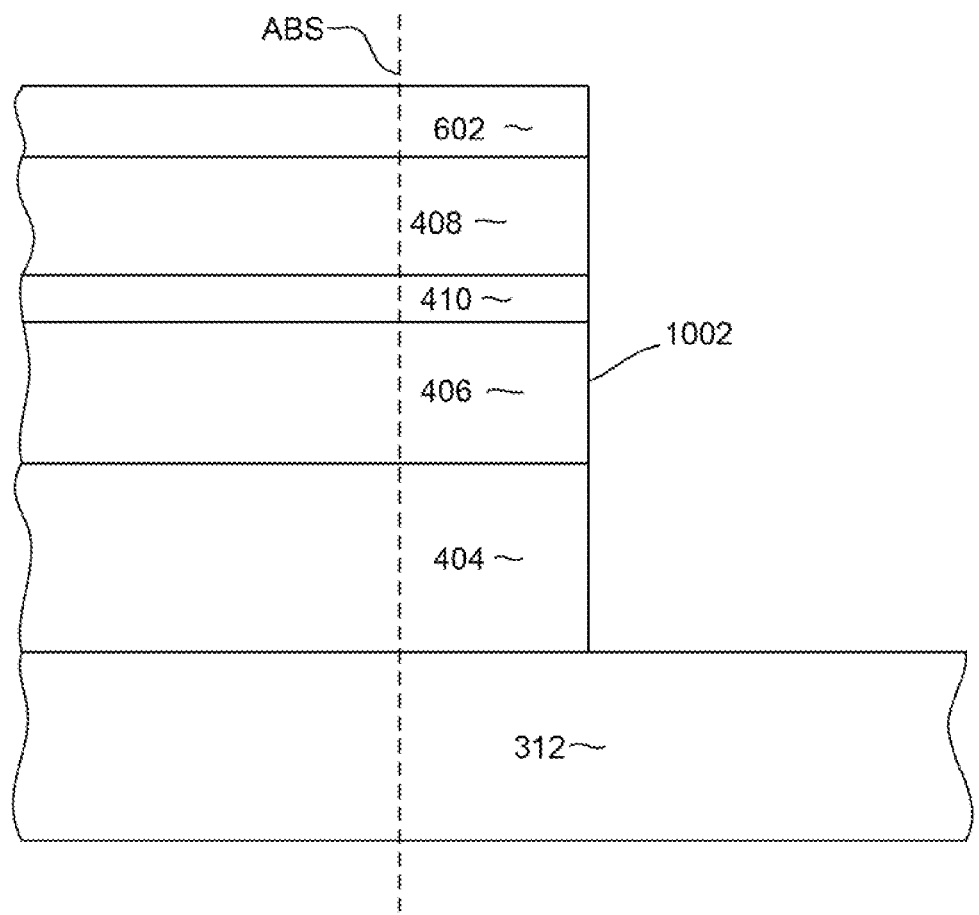

FIG. 8-10 show a portion of a plasmonic device in various intermediate stages of manufacture, and illustrate how an antenna constructed according to the present invention can withstand these processes to form a well defined antenna with smooth sides and a smooth upper surface.

With reference now to FIG. 8, a substrate 312 is provided. This can be the insulating fill layer 312 described above with reference to FIG. 3, and can be constructed of a material such as alumina. Then, a cladding layer 404 is deposited over the substrate 312. As described above, the cladding material can also be a material such as alumina that has been configured to define the cladding of a plasmonic heating device. A metal alloy antenna material 406 is then deposited over the cladding material 404. As described above, the antenna material 406 is an alloy of AuX, CuX, AgX or AlX, where X is Cu, Ni, Ta, Ti, Zr, V, Nb, Cr, Mo, Y, W, Ru, Rh or Pt, and wherein the alloy is less than 5 atomic percent X (but greater than 0 atomic percent X).

An aperture material 410 is then deposited over the antenna material 406, and the aperture is constructed of a material having a low refractive index (less than 1.75) such as alumina SiOx or SiOxNy. At this stage photolithography is done to obtain the desired shape for the antenna and the aperture as shown in FIG. 5 and a CMP process is used to planarize the surface 512 shown in FIG. 5. A magnetic lip material 408 such as CoFe is then deposited over the aperture material. Another CMP step can be used to planarize the AuX surface 514 as shown in the FIG. 5. A masking material 602 is deposited over the magnetic lip material 408. The mask material 602 can be a photoresist material, but can also contain layers such as one or more hard mask layers, an image transfer layer and a bottom antireflective coating (BARC) (not shown).

Then, with reference to FIG. 9 the mask 602 is photolithographically patterned to form a mask 602 that has a back edge 604 at a desired location from the air bearing surface plane (ABS). Then, an ion milling process is performed to transfer the image of the mask 602 onto the underlying layers 408, 410, 406 and 404, leaving a structure as shown in FIG. 10. If pure Au were used as the aperture material 406, this ion milling would result in a wavy, poorly defined back edge, which is the surface 1002. This waviness would greatly degrade the performance of the device. Because the antenna 406 is constructed of a harder metal alloy material described above, the ion milling produces a smooth, flat well defined back edge 1002 on the antenna 406. Then, the waveguide material is deposited so that it makes good contact with the back edge 1002.

A slicing and lapping process is performed at the slider fabrication level to define the air bearing surface (ABS) as shown in FIG. 4. The lapping process involves the use of polishing slurry that contains abrasive particles. If pure Au were used as the antenna material 406, this softness would allow these abrasive particles to become embedded in the ABS surface of the antenna, thereby degrading the performance of the antenna 406. Because the antenna is constructed of a harder metal alloy, this embedding of particles does not occur and the performance of the antenna is maintained.

Figure 6:
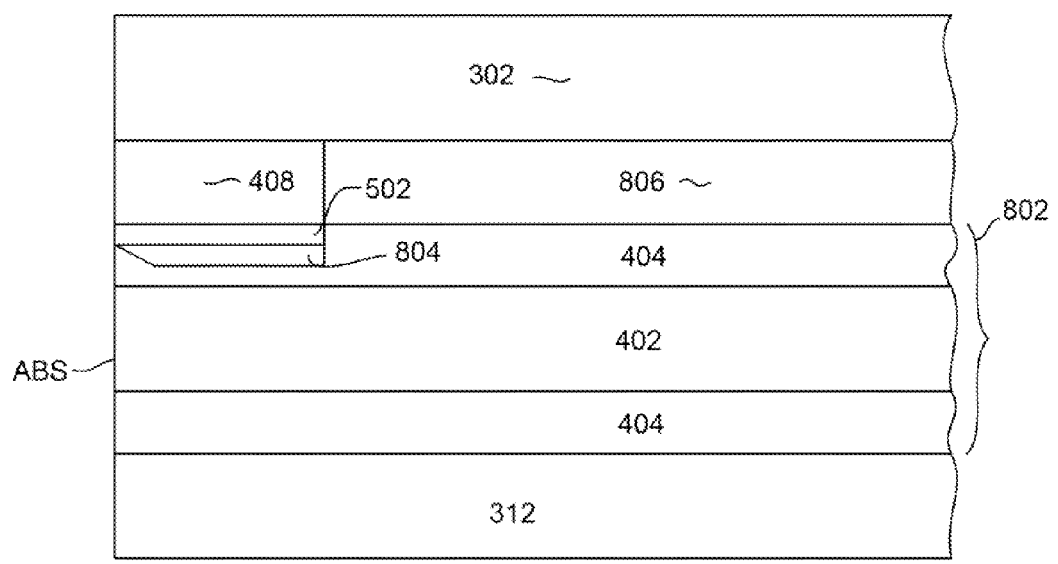
FIG. 6 is a cross sectional view of a write head showing a near field transducer heating element comprising of alloyed metal film according to an alternate embodiment of the invention.
Figure 7:
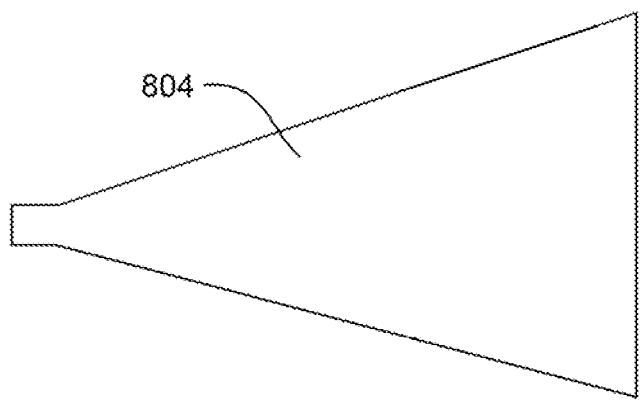
FIG. 7 is a top down view of a plasmonic antenna of a heating element comprising an alloyed metal film from the embodiment of FIG. 6, and FIGS. 8-10 are views of an antenna of a portion of a plasmonic heating device in various intermediate stages of manufacturing illustrating an improvement in antenna definition provided by the present invention.

In addition, the magnetic antenna 406 could have a shape other than that discussed above. For example, the antenna 406 could be a nano-beak design having a shape similar to a bird's beak, narrowing to a point at the air bearing surface. FIGS. 6 and 7 illustrate such an embodiment of the invention where the antenna is a nano-beak antenna 804. The nano-beak antenna 804 is located within the cladding material 404 adjacent to and separated from the magnetic lip 408 by a diffusion barrier layer 502, which may be constructed of a material or materials described above. The length of the nano-beak metal 804 and the diffusion barrier layer 502, as measured from the ABS, is same as the length of the magnetic lip 408 as shown in FIG. 8. As can be seen, the antenna 804 has a tapered point at the ABS. The wave guide 802 can be separated from the upper return pole 302 by a non-magnetic spacer layer 806. A top down view of the antenna is shown in FIG. 7, wherein it can be seen that the antenna 804 also narrows to a point at the ABS as viewed from the top down. Light traveling through the waveguide 402 is drawn to the antenna forming an extremely focused hot spot at the pointed tip of the antenna 804. Again, heat from this hot stop could cause diffusion between the antenna 804 and the magnetic lip 408. However, this diffusion is prevented by the presence of the diffusion barrier layer 502 there-between. Therefore, the presence of the diffusion barrier layer 502 provides the same advantage in this presently described embodiment as it did in the previously described embodiment.

Other antenna shapes include a lollipop shape, a bow tie shape or a two-rod antenna. Similarly, the shape or configuration of the aperture 410 could vary as well. For example, the aperture could have a "C" shape, a triangular shape or could be configured as a ridge waveguide aperture. In addition, the NFT could be a Very Small Aperture Laser (VSAL).

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A heating device for use in a thermally assisted magnetic write head, comprising:
   a plasmonic antenna, wherein
   the plasmonic antenna comprises a non-magnetic metal alloy; and
   an aperture contacting at least one edge of the plasmonic antenna.

2. A heating device as in claim 1 wherein the metal alloy is a gold alloy, AuX, wherein X is Cu, Ni, Ta, Ti, Zr, V, Nb, Cr, Mo, Y, W, Ru, Rh or Pt.

3. A heating device as in claim 1 wherein the metal alloy is a gold alloy, AuX, wherein X is Cu, Ni, Ta, Ti, Zr, V, Nb, Cr, Mo, Y, W, Ru, Rh or Pt, the concentration of X being less than 5 atomic percent.

4. A heating device as in claim 1 wherein the metal alloy is a copper alloy, CuX, wherein X is Ni, Ta, Ti, Zr, V, Nb, Cr, Mo, Y, W, Ru, Rh or Pt.

5. A heating device as in claim 1 wherein the metal alloy is a copper alloy, CuX, wherein X is Ni, Ta, Ti, Zr, V, Nb, Cr, Mo, Y, W, Ru, Rh or Pt, the concentration of X being less than 5 atomic percent.

6. A heating device as in claim 1 wherein the metal alloy is a silver alloy, AgX, wherein X is Ni, Ta, Ti, Zr, V, Nb, Cr, Mo, Y, W, Ru, Rh or Pt.

7. A heating device as in claim 1 wherein the metal alloy is a silver alloy, AgX, wherein X is Ni, Ta, Ti, Zr, V, Nb, Cr, Mo, Y, W, Ru, Rh or Pt, the concentration of X being less than 5 atomic percent.

8. A heating device as in claim 1 wherein the metal alloy is a Aluminum alloy, AlX, wherein X is Ni, Ta, Ti, Zr, V, Nb, Cr, Mo, Y, W, Ru, Rh or Pt.

9. A heating device as in claim 1 wherein the metal alloy is a Aluminum alloy, AlX, wherein X is Ni, Ta, Ti, Zr, V, Nb, Cr, Mo, Y, W, Ru, Rh or Pt, the concentration of X being less than 5 atomic percent.

* * * * *